United States Patent
Tonsfeldt

[15] 3,693,725
[45] Sept. 26, 1972

[54] DIVERGING TOOL MOUNTS HAVING A PLURALITY OF APERTURES FOR LATERAL ADJUSTMENT OF THE TOOLS

[72] Inventor: Wayne S. Tonsfeldt, Sabin, Minn. 56580

[22] Filed: Feb. 16, 1970

[21] Appl. No.: 879,637

Related U.S. Application Data

[63] Continuation-in-part of Ser. No. 559,616, June 22, 1966, abandoned.

[52] U.S. Cl. .................. 172/655, 172/656, 172/686, 172/690, 172/741, 306/1.5, 248/226
[51] Int. Cl. ...................... A01b 39/22, A01b 65/02
[58] Field of Search...... 172/540, 574, 555, 550, 655, 172/656, 152, 254, 510, 155, 156, 762, 690, 673, 693, 697; 111/87, 88; 306/1.5, 1.6

[56] References Cited

UNITED STATES PATENTS

| | | | |
|---|---|---|---|
| 3,173,498 | 4/1965 | Heilbrun | 172/540 |
| 1,260,174 | 4/1918 | Fisher | 172/574 |
| 1,284,626 | 11/1918 | Englund | 172/156 |
| 1,578,774 | 3/1926 | Smith | 172/690 |
| 2,734,439 | 2/1956 | Padrick | 172/156 |
| 1,355,454 | 10/1920 | Degge | 172/655 |
| 1,567,964 | 12/1925 | McCasland | 172/655 |
| 1,713,744 | 5/1929 | Darby | 172/655 |

FOREIGN PATENTS OR APPLICATIONS

620,088   4/1927   France.....................172/574

Primary Examiner—Robert E. Pulfrey
Assistant Examiner—C. W. Hanor
Attorney—James R. Cwayna

[57] ABSTRACT

This invention relates to a tool mounting bar for mounting various pairs of cultivating and other field preparing tools onto a tool bar and includes a generally vertically arranged upright support member for attachment to a tool bar and a pair of diverging implement mounting elements at the lower end thereof such that a pair of implements may be mounted on each individual support member. The diverging support members include two modifications, one providing a plurality of apertures for mounting of various elements thereon and the other providing a slideable clamping member for sliding and positioning on the diverging members with the implement being connected directly to the clamping device. This slideable clamping device permits a wide range of adjustments for the implements.

1 Claim, 6 Drawing Figures

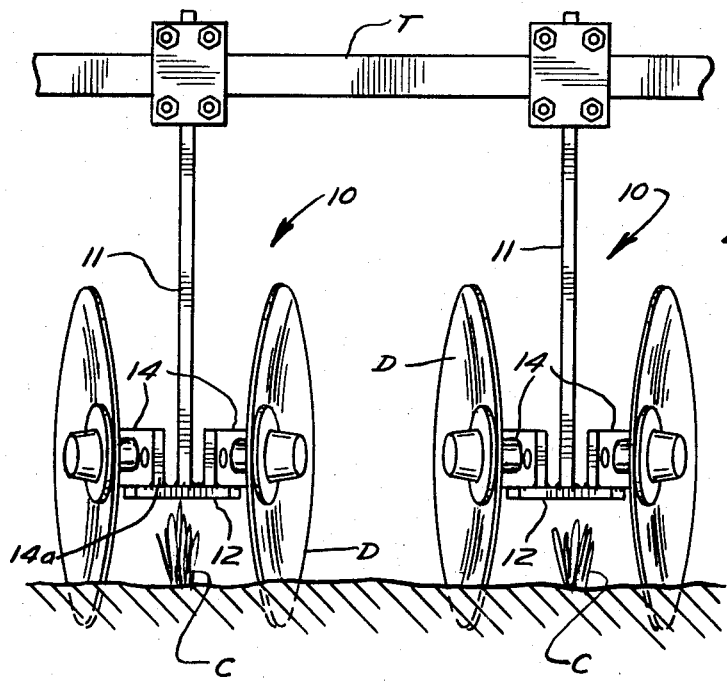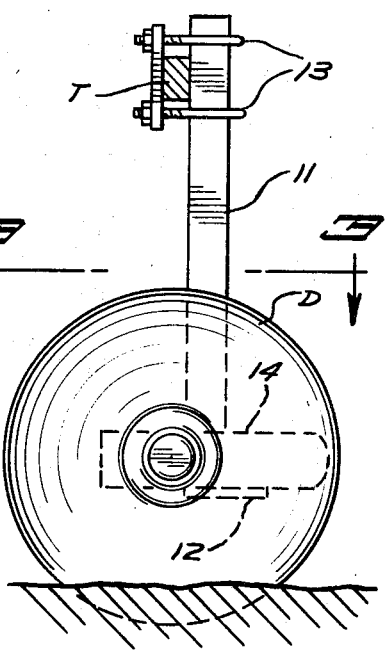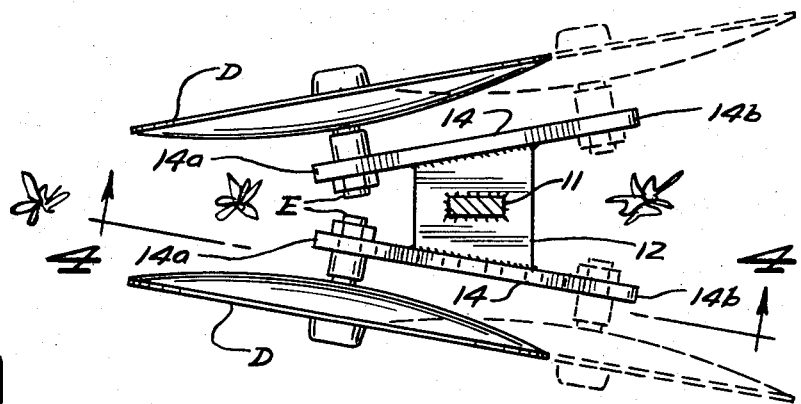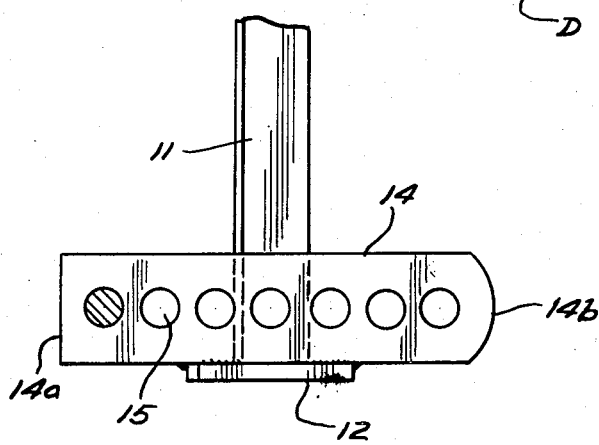

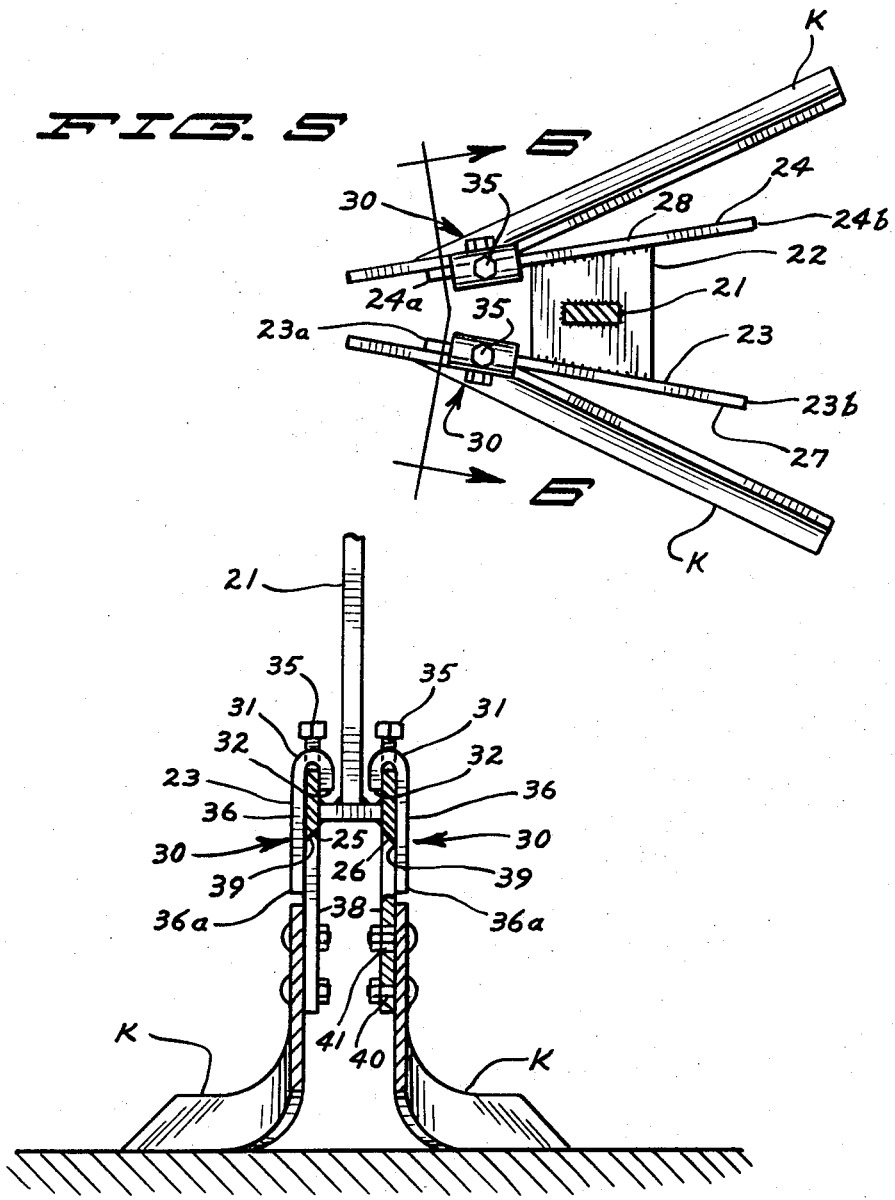

DIVERGING TOOL MOUNTS HAVING A PLURALITY OF APERTURES FOR LATERAL ADJUSTMENT OF THE TOOLS

This is a Continuation-In-Part application of my previous patent application filed June 22, 1966, Ser. No. 559,616, now abandoned and entitled CULTIVATOR DISC BAR.

To those experienced in the farming field it is common knowledge that when cultivating row crops or the like, it is necessary to mount a cultivator disc on both sides of the row crop and when using the now available equipment a single mounting bar is necessary for each disc so mounted. This present single disc, single mounting bar arrangement presents a time consuming readying tack for the farmer in that it is necessary to control the height, pitch and spacing of each disc and after making any adjustment in any one of these three factors, it is necessary to re-check the other factors. When the farmer is utilizing a tool bar to cultivate eight or so rows of crops this then, is a very time consuming operation.

With the unit proposed by applicant, a pair of cultivator discs are carried on a single mounting bar and once the row spacing and height requirements have been established for the discs the desired distance between the discs is easily obtained by simply moving the discs on a diverging mounting section of the bar. This mounting section is so arranged to provide constant pitch placement for the discs.

With the variations afforded in this device, a slideable clamping member is provided to simplify the mounting and adjustment of various elements on the diverging mounting portions of this bar and the clamping member includes a wedge type device with means for simply tightening the wedge to the diverging mounting section with means on the clamping device for carrying the desired implement. Naturally, with this sliding wedge construction, it is possible to obtain more adjustments than when the device is provided with a simple plurality of spaced holes along the diverging mounting portions.

It is therefore an object of applicants's invention to provide a multiple cultivator disc mounting unit adapted for carrying at least two cultivator discs.

It is a further object of applicant's invention to provide a mounting unit for a pair of cultivator discs which will permit the spacing between discs to be easily altered.

It is a further object of applicant's invention to provide a mounting bar for a pair of cultivator discs wherein the discs may be moved with respect to one another but wherein the pitch of the discs will be maintained.

It is a further object of applicant's invention to provide a mounting bar for a pair of tools or implements which provides a slideable clamp type device affording the adjustment and spacing between the members which clamp type device is designed to provide a wedging effect for positively locating and holding the members in proper position.

These and other objects and advantages of my invention will more fully appear from the following description made in connection with the accompanying drawings, wherein like reference characters refer to the same or similar parts throughout the several views, and in which:

FIG. 1 is a partial front elevation view of cultivator apparatus for two rows of crops which apparatus embodies the concepts of applicant's invention;

FIG. 2 is a side elevation of FIG. 1;

FIG. 3 is a horizontal section taken substantially along line 3—3 of FIG. 2;

FIG. 4 is a vertical section taken substantially along line 4—4 of FIG. 3;

FIG. 5 is a plan view of a modified form of the invention; and

FIG. 6 is a vertical section taken substantially along line 6—6 of FIG. 5.

In accordance with the accompanying drawings the cultivator disc mounting unit 10 embodying the concept of applicant's invention includes a central T shaped structure having an upstanding leg member 11 and a horizontally disposed support section 12. Leg section 11 is adapted to extend downwardly from a tool bar T of a cultivator or the like and leg 11 is arranged for attachment to the tool bar T through the use of U-brackets 13—13 or the like. This mounting method incorporating the U-brackets 13 is a standard mounting method.

The horizontal support section 12 includes disc mounting elements 14—14 thereon and in the form shown these elements 14—14 are arranged in diverging relationship upon plate 12. This divergence is particularly illustrated in FIG. 3 wherein the fronts 14a of the disc mounting element 14 are arranged in substantially closely spaced relationship while the rear portions 14b thereof are spaced a predetermined distance. The mounting elements as shown are arranged in upstanding overlying relationship to plate 12 and are securely attached thereto.

A plurality of mounting apertures 15 are provided in spaced relationship entirely along the longitudinal dimension of mounting plate 14 such that the cultivator discs D may be positioned in any of the apertures 15 and should be obvious and as illustrated in FIG. 3 the distance between the discs is increased as they are moved rearwardly on the mounting members 14.

Cultivator discs D are of standard construction and this mounting unit 10 is adapted to hold all of the various forms of discs D securely thereon. As is well known, these discs D are provided with bearing members for free rotation about a mounting shaft E.

The construction of the mounting plates 14 with respect to the plates 12 and mounting legs 11 affords a rigid non-moveable support for the cultivator discs. By providing this type of support it is possible to maintain the proper pitch of the discs, which pitch is defined as the cutting angle with respect to the row of crops being cultivated, such that the discs D are always cutting at the desired pitch angle. The use of a multiple mounting arrangement affords means to cultivate on both sides of crop rows without requiring a dual operation in mounting the discs. Likewise the dimension between discs may be easily altered without shifting the position of the leg 11 on the bar T.

A modified form of the invention is illustrated in FIGS. 5 and 6 and this form of the invention may be utilized for mounting either discs or other cultivating tools such as cutting knives K. In the form shown this unit is designated in its entirety 20 and again includes a mounting bar member 21 to be attached to the tool bar and includes a first lower plate member 22 rigidly attached to the bottom portion of the mounting leg 11 with a pair of mounting elements 23–24 secured thereto and arranged angularly thereon such that the forwardmost ends thereof 23a–24a are relatively close to one another while the rear portions thereof 23b–24b are in diverging relation to the front ends 23a–24a thereof. This same relationship exists as in the first discussed form of the invention between the mounting plates 14—14. In the form shown these mounting members 23–24 are provided with an upwardly and inwardly converging lower wedge or camming section 25–26 extending the entire length of said members 23–24 with the top surfaces 27–28 being substantially flat and horizontally disposed. A clamp member generally designated 30 is provided which includes a generally arcuate top section 31 having a downwardly extending leg 32 to engage over the upper flat surfaces 27–28 of the mounting members 23–24 with a threaded passage 33 formed therethrough for receiving a clamping bolt member 35 or the like. The opposite side 36 of the clamp member 30 extends adjacently downward the outer side of the mounting members 23–24 and in the form shown a second member is secured to the lower end 36a thereof. This second downwardly extending member 38 provides an upwardly and inwardly inclined camming surface 39 to engage with the aforementioned wedge or camming surface 25 of the mounting members 23–24. The spacing between this camming surface 39 and the arcuate area 31 of the clamp member 30 is predetermined such that the unit is normally free to slide upon the mounting members 23–24 but that the bolt member 35 when engaged in the threaded aperture 33 will draw the wedged surfaces into proper tightened position with respect to one another for holding of the units together.

In the form shown a pair of apertures designated respectively 40–41 are provided on the lowermost section 38 of the clamp 30 and in the form shown aperture 40 defines an arcuate passage while aperture 41 defines a slot passage. This slot and arcuate differentiation is provided for proper mounting of various articles to the clamp member 30. In the form shown a pair of knives K are mounted on the clamp members 30 and applicant has found that it may be desireable to provide a slightly arcuate bend in the lower portion 38 thereof when mounting discs D thereon. Naturally in a disc mounting system only one of the apertures 40 would be utilized as the disc is rotatably mounted to the clamp member 40. This then would be provided to obtain the proper pitch for the particular disc D utilized and therefore the rotation would be about a vertical axis which axis would extend between the aperture 40 and the threaded aperture 33.

Obviously with this modified form of the invention a highly adjustable unit is provided in that the entire length of the mounting bars 23–24 may be utilized for locating the elements thereon. The spaced apertures in the first discussed form provide a plurality of locations but this sliding effect increases this number of possible locations limitlessly.

It should be obvious that applicant has provided a unique unit such that a pair of tools may be carried thereon which permits shifting of the spacing between such tools without requiring a corresponding change in the location of the mounting member of the tool bar.

WHAT IS CLAIMED IS:

1. An earth-working tool holder for carrying a plurality of earth-working tools comprising in combination:
   a. a generally upright standard having a lower end;
   b. a generally horizontal plate having a center section and forwardly converging side portions, said lower end of the standard being secured to the center section of the top of the plate;
   c. a first side member fixedly secured to one side portion of the plate;
   d. a second side member fixedly secured to the other side portion of the plate, said first and second side members located in generally horizontal positions, said side member having portions extending below the plane of said horizontal plate and converging toward each other in the forward direction;
   e. the side members being generally flat bars located in converging generally vertical planes, each bar having a first end portion projected forwardly of the plate and a second end portion projected rearwardly of the plate;
   f. Each side member having a plurality of apertures arranged in longitudinal spaced relationship;
   g. first earth-working tool means for working the ground;
   h. first attaching means connected to the first earth-working tool means, said first attaching means having means for adjustably mounting the first attaching means at a selected longitudinal aperture on the first side member;
   i. second earth-working tool means for working the ground;
   j. second attaching means connected to the second earth-working tool means, said second attaching means having means for adjustably mounting the second attaching means at a selected longitudinal aperture on the second side member, whereby adjustment of the positions of the first and second attaching means on their respective side members adjusts the distance between the first and second earth-working tool means while positively maintaining the same angular relation between the tool means.

* * * * *